(12) United States Patent
Fukui

(10) Patent No.: US 12,330,636 B2
(45) Date of Patent: Jun. 17, 2025

(54) VEHICLE DRIVING ASSISTANCE APPARATUS

(71) Applicant: TOYOTA JIDOSHA KABUSHIKI KAISHA, Toyota (JP)

(72) Inventor: Yusuke Fukui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 18/095,328

(22) Filed: Jan. 10, 2023

(65) Prior Publication Data

US 2023/0219566 A1    Jul. 13, 2023

(30) Foreign Application Priority Data

Jan. 11, 2022 (JP) ................. 2022-002248

(51) Int. Cl.
*B60W 30/09* (2012.01)
*B60W 10/18* (2012.01)
*B60W 30/095* (2012.01)

(52) U.S. Cl.
CPC ............ *B60W 30/09* (2013.01); *B60W 10/18* (2013.01); *B60W 30/0956* (2013.01); *B60W 2300/14* (2013.01); *B60W 2420/408* (2024.01); *B60W 2520/22* (2013.01); *B60W 2554/4041* (2020.02); *B60W 2710/18* (2013.01)

(58) Field of Classification Search
None
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,126,755 B1* | 11/2018 | Lavi | G05D 1/0214 |
| 10,793,147 B2 | 10/2020 | Kaminade et al. | |
| 2009/0306861 A1* | 12/2009 | Schumann | B60T 8/17552 303/123 |

(Continued)

FOREIGN PATENT DOCUMENTS

| | | |
|---|---|---|
| JP | 2000-43705 A | 2/2000 |
| JP | 2011-25921 A | 2/2011 |

(Continued)

*Primary Examiner* — Daniel L Greene
(74) *Attorney, Agent, or Firm* — Sughrue Mion, PLLC

(57) ABSTRACT

A vehicle driving assistance apparatus executes a collision avoidance control to avoid a collision of an own vehicle with an object ahead of the own vehicle by forcibly braking and stopping the own vehicle before the object when a collision condition that the own vehicle collides with the object, becomes satisfied. The vehicle driving assistance apparatus acquires information on a situation behind the own vehicle as rearward detection information when the own vehicle tows a trailer, acquires an angle between a moving vector of the own vehicle and a moving vector of the trailer as a towing angle. and keep the collision avoidance control unexecuted even when the collision condition becomes satisfied when a forbiddance condition that the towing angle is equal to or greater than a predetermined towing angle, is satisfied.

5 Claims, 14 Drawing Sheets

(56) References Cited

U.S. PATENT DOCUMENTS

| | | | |
|---|---|---|---|
| 2010/0198491 A1* | 8/2010 | Mays | B60W 50/0097 |
| | | | 701/31.4 |
| 2011/0022282 A1 | 1/2011 | Wu et al. | |
| 2012/0029782 A1 | 2/2012 | Suda | |
| 2017/0235307 A1* | 8/2017 | Asakura | G05D 1/0061 |
| | | | 701/23 |
| 2019/0322273 A1* | 10/2019 | Wu | B60W 30/09 |
| 2020/0331527 A1* | 10/2020 | Kim | B62D 15/021 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0155232 A1 | 5/2021 | Ike et al. | |

FOREIGN PATENT DOCUMENTS

| | | |
|---|---|---|
| JP | 2021-79904 A | 5/2021 |
| WO | 2010/087022 A1 | 8/2010 |

* cited by examiner

VEHICLE DRIVING ASSISTANCE APPARATUS

CROSS-REFERENCE TO RELATED APPLICATIONS

This application claims priority to Japanese patent application No. JP 2022-2248 filed on Jan. 11, 2022, the content of which is hereby incorporated by reference in its entirety.

BACKGROUND

Field

The invention relates to a vehicle driving assistance apparatus.

Description of the Related Art

There is known a vehicle driving assistance apparatus which executes a collision avoidance control for avoiding a collision of an own vehicle with an object ahead of the own vehicle by forcibly braking the own vehicle to stop the same before the object when there is a probability that the own vehicle collides with the object (for example, see JP 2021-79904 A).

When the own vehicle tows another vehicle such as a trailer, and there is the probability that the own vehicle collides with the object ahead of the own vehicle, it is effective to execute the collision avoidance control to forcibly braking the own vehicle to stop the same before the object in order to avoid the collision of the own vehicle with the object. In this regard, when a towing vehicle (i.e., the own vehicle towing the other vehicle) turns, the towing vehicle and a towed vehicle (i.e., the other vehicle towed by the own vehicle) may move in different directions. In this case, a moving direction of the own vehicle does not correspond to a moving direction of the towed vehicle. If the collision avoidance control starts to be executed to forcibly brake the own vehicle when the moving direction of the own vehicle does not correspond to the moving direction of the towed vehicle, the own vehicle is pushed by the towed vehicle, and the Jackknifing of the own vehicle may occur.

Thus, it is preferred not to execute the collision avoidance control when executing the collision avoidance control may lead to the Jackknifing in the own vehicle. On the other hand, when executing the collision avoidance control does not lead to the Jackknifing in the own vehicle, it is preferred to execute the collision avoidance control. In this regard, in order to execute the collision avoidance control when executing the collision avoidance control does not lead to the Jackknifing in the own vehicle and not to execute the collision avoidance control when executing the collision avoidance control leads to the Jackknifing in the own vehicle, an accurate determination of whether executing the collision avoidance control leads to the Jackknifing in the own vehicle, is required.

SUMMARY

An object of the invention is to provide a vehicle driving assistance apparatus which can accurately determine whether the Jackknifing is led in the own vehicle by executing the collision avoidance control to forcibly brake and stop the own vehicle in order to avoid the collision of the own vehicle towing the other vehicle with the object ahead of the own vehicle.

According to the invention, a vehicle driving assistance apparatus comprises an electronic control unit which executes a collision avoidance control to avoid a collision of an own vehicle with an object ahead of the own vehicle by forcibly braking and stopping the own vehicle before the object when a collision condition that the own vehicle collides with the object, becomes satisfied. The electronic control unit is configured to acquire information on a situation behind the own vehicle as rearward detection information when the own vehicle tows a trailer, acquire an angle between a moving vector of the own vehicle and a moving vector of the trailer as a towing angle, and keep the collision avoidance control unexecuted even when the collision condition becomes satisfied when a forbiddance condition that the towing angle is equal to or greater than a predetermined towing angle, is satisfied.

With the invention, the towing angle is acquired, based on the information on the situation behind the own vehicle. Thus, the acquired towing angle is accurate. Then, whether the collision avoidance control needs to be executed, is determined, based on the accurate towing angle. Thus, whether the Jackknifing of the own vehicle occurs due to executing the collision avoidance control, can be accurately determined.

According to an aspect of the invention, the vehicle driving assistance apparatus may include a rearward information detection apparatus which detects information on the object behind the own vehicle as the rearward detection information.

According to another aspect of the invention, the rearward information detection apparatus may include at least one radio wave sensor provided on the own vehicle so as to transmit radio waves rearward from the own vehicle.

According to further another aspect of the invention, the electronic control unit may be configured to determine that the forbiddance condition is satisfied and keep the collision avoidance control unexecuted when the towing angle is predicted to become equal to or greater than the predetermined towing angle even when (i) the collision condition becomes satisfied, and (ii) the towing angle is smaller than the predetermined towing angle.

With this aspect of the invention, whether the Jackknifing of the own vehicle occurs due to executing the collision avoidance control, can be more accurately determined.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
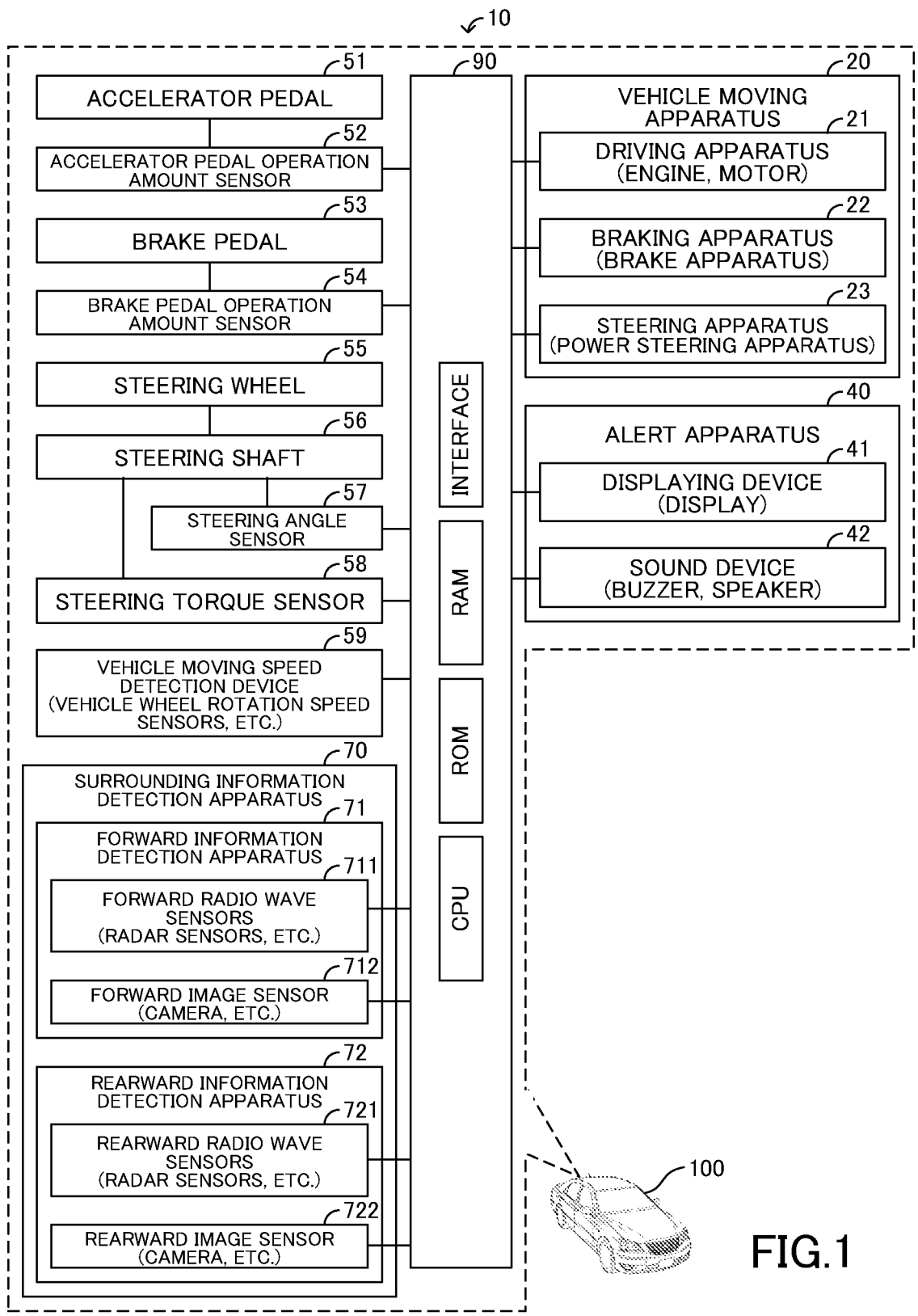
FIG. 1 is a view which shows a vehicle driving assistance apparatus according to an embodiment of the invention and a vehicle or an own vehicle installed with the vehicle driving assistance apparatus.

Below, a vehicle driving assistance apparatus according to an embodiment of the invention will be described with reference to the drawings. As shown in FIG. 1, the vehicle driving assistance apparatus 10 according to the embodiment of the invention is installed on an own vehicle 100.

ECU

The vehicle driving assistance apparatus 10 includes an ECU 90 as a control device. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM.

Vehicle Moving Apparatus

The own vehicle 100 is installed with a vehicle moving apparatus 20. The vehicle moving apparatus 20 includes a driving apparatus 21, a braking apparatus 22, and a steering apparatus 23.

Driving Apparatus

The driving apparatus 21 is an apparatus which outputs a driving force or a driving torque to be applied to the own vehicle 100 to move the same. The driving apparatus 21 includes, for example, an internal combustion engine and at least one electric motor. The driving apparatus 21 is electrically connected to the ECU 90. The ECU 90 controls the driving force output from the driving apparatus 21 by controlling operations of the driving apparatus 21. Thus, the ECU 90 controls the driving force applied to the own vehicle 100 by controlling the operations of the driving apparatus 21.

Braking Apparatus

The braking apparatus 22 is an apparatus which outputs a braking force or a braking torque to be applied to the own vehicle 100 to brake the same. The braking apparatus 22 is, for example, a brake apparatus. The braking apparatus 22 is electrically connected to the ECU 90. The ECU 90 controls the braking force output from the braking apparatus 22 by controlling operations of the braking apparatus 22. Thus, the ECU 90 controls the braking force applied to the own vehicle 100 by controlling the operations of the braking apparatus 22.

Steering Apparatus

The steering apparatus 23 is an apparatus which outputs a steering force or a steering torque to be applied to the own vehicle 100 to steer the same. The steering apparatus 23 is, for example, a power steering apparatus. The steering apparatus 23 is electrically connected to the ECU 90. The ECU 90 controls the steering force output from the steering apparatus 23 by controlling operations of the steering apparatus 23. Thus, the ECU 90 controls the steering force applied to the own vehicle 100 by controlling the operations of the steering apparatus 23.

Alert Apparatus

Further, the own vehicle 100 is installed with an alert apparatus 40. The alert apparatus 40 is an apparatus which provides a driver of the own vehicle 100 with performs various alerts. In this embodiment, the alert apparatus 40 includes a displaying device 41 and a sound device 42.

Displaying Device

The displaying device 41 is a device which displays various images thereon. The displaying device 41 is, for example, a display in a combination meter, a head-up display, or a display of a car navigation device. The displaying device 41 is electrically connected to the ECU 90. The ECU 90 can display various images on the displaying device 41.

Sound Device

The sound device 42 is a device which outputs various informing sounds, various alert sounds, various informing announcements, or various alert announcements. The sound device 42 is, for example, a buzzer or a speaker. The sound device 42 is electrically connected to the ECU 90. The ECU 90 can output various informing sounds, various alert sounds, various informing announcements, or various alert announcements from the sound device 42.

Sensors, Etc.

Further, the own vehicle 100 is installed with an accelerator pedal 51 as an acceleration operator, an accelerator pedal operation amount sensor 52, a brake pedal 53 as a brake operator, a brake pedal operation amount sensor 54, a steering wheel 55 as a moving direction changing operator, a steering shaft 56, a steering angle sensor 57, a steering torque sensor 58, a vehicle moving speed detection device 59, and a surrounding information detection apparatus 70.

Accelerator Pedal Operation Amount Sensor

The accelerator pedal operation amount sensor 52 is a sensor which detects an operation amount of the accelerator pedal 51. The accelerator pedal operation amount sensor 52 is electrically connected to the ECU 90. The accelerator pedal operation amount sensor 52 sends information on the detected operation amount of the accelerator pedal 51 to the ECU 90. The ECU 90 acquires the operation amount of the accelerator pedal 51 as an accelerator pedal operation amount AP, based on the information sent from the accelerator pedal operation amount sensor 52. The ECU 90 calculates and acquires a requested driving force or a requested driving torque, based on the accelerator pedal operation amount AP and an own vehicle moving speed V100, i.e., a moving speed of the own vehicle 100. The requested driving force is the driving force requested to be output from the driving apparatus 21. The ECU 90 controls the operations of the driving apparatus 21 so as to output the driving force corresponding to the requested driving force when the ECU 90 does not execute a collision avoidance control described later in detail.

Brake Pedal Operation Amount Sensor

The brake pedal operation amount sensor 54 is a sensor which detects an operation amount of the brake pedal 53. The brake pedal operation amount sensor 54 is electrically connected to the ECU 90. The brake pedal operation amount sensor 54 sends information on the detected operation amount of the brake pedal 53 to the ECU 90. The ECU 90 acquires the operation amount of the brake pedal 53 as a brake pedal operation amount BP, based on the information sent from the brake pedal operation amount sensor 54. The ECU 90 calculates and acquires a requested braking force or a requested braking torque, based on the brake pedal operation amount BP. The requested braking force is the braking force requested to be output from the braking apparatus 22. The ECU 90 controls the operations of the braking apparatus 22 so as to output the braking force corresponding to the requested braking force when the ECU 90 does not execute the collision avoidance control described later in detail.

Steering Angle Sensor

The steering angle sensor 57 is a sensor which detects a rotation angle of the steering shaft 56 with respect to its neutral position. The steering angle sensor 57 is electrically connected to the ECU 90. The steering angle sensor 57 sends information on the detected rotation angle of the steering shaft 56 to the ECU 90. The ECU 90 acquires the rotation angle of the steering shaft 56 as a steering angle $\theta$st, based on the information sent from the steering angle sensor 57.

Steering Torque Sensor

The steering torque sensor 58 is a sensor which detects a torque which the driver of the own vehicle 100 inputs via the steering wheel 55. The steering torque sensor 58 is electrically connected to the ECU 90. The steering torque sensor 58 sends information on the detected torque to the ECU 90. The ECU 90 acquires the torque which the driver inputs via the steering wheel 55 as a driver input torque, based on the information sent from the steering torque sensor 58.

Vehicle Moving Speed Detection Device

The vehicle moving speed detection device 59 is a device which detects the moving speed of the own vehicle 100. The vehicle moving speed detection device 59 includes, for example, vehicle wheel rotation speed sensors. The vehicle moving speed detection device 59 is electrically connected to the ECU 90. The vehicle moving speed detection device 59 sends information on the detected moving speed of the own vehicle 100 to the ECU 90. The ECU 90 acquires the moving speed of the own vehicle 100 as the own vehicle moving speed V100, based on the information sent from the vehicle moving speed detection device 59.

The ECU 90 calculates and acquires a requested steering force or a requested steering torque, based on the steering angle $\theta$st, the driver input torque, and the own vehicle moving speed V100. The requested steering force is the steering force requested to be output from the steering apparatus 23. The ECU 90 controls the operations of the steering apparatus 23 so as to output the steering force corresponding to the requested steering force when the ECU 90 does not execute the collision avoidance control described later in detail.

Surrounding Information Detection Apparatus

The surrounding information detection apparatus 70 is an apparatus which detects information on a situation around the own vehicle 100. The surrounding information detection apparatus 70 includes a forward information detection apparatus 71 and a rearward information detection apparatus 72. The forward information detection apparatus 71 detects information on a situation ahead of the own vehicle 100. The rearward information detection apparatus 72 detects information on a situation behind the own vehicle 100. In this embodiment, the forward information detection apparatus 71 includes at least one forward radio wave sensor 711 and at least one forward image sensor 712. Similarly, the rearward information detection apparatus 72 includes at least one rearward radio wave sensor 721 and at least one rearward image sensor 722.

The forward radio wave sensor 711 and the rearward radio wave sensor 721 are, for example, radar sensors such as millimeter wave radars. The forward image sensor 712 and the rearward image sensor 722 are, for example, cameras. It should be noted that the forward information detection apparatus 71 and the rearward information detection apparatus 72 may include sonic wave sensors such as ultrasonic wave sensors such as clearance sonars and optical sensors such as laser radars such as LiDARs.

Radio Wave Sensors

The forward radio wave sensor 711 and the rearward radio wave sensor 721 are electrically connected to the ECU 90. The forward radio wave sensor 711 and the rearward radio wave sensor 721 transmit radio waves and receive reflected waves, i.e., the radio waves reflected by objects. The forward radio wave sensor 711 and the rearward radio wave sensor 721 send information on the transmitted radio waves and the received reflected waves to the ECU 90. In other words, the forward radio wave sensor 711 and the rearward radio wave sensor 721 detect objects around the own vehicle 100 and send information on the detected objects to the ECU 90. The ECU 90 can acquire information on the objects around the own vehicle 100 as surrounding detection information IS, based on radio wave information, i.e., the information sent from the forward radio wave sensor 711 and the rearward radio wave sensor 721. It should be noted that in this embodiment, the objects include vehicles, motor bikes, bicycles, and persons.

Figure 2:
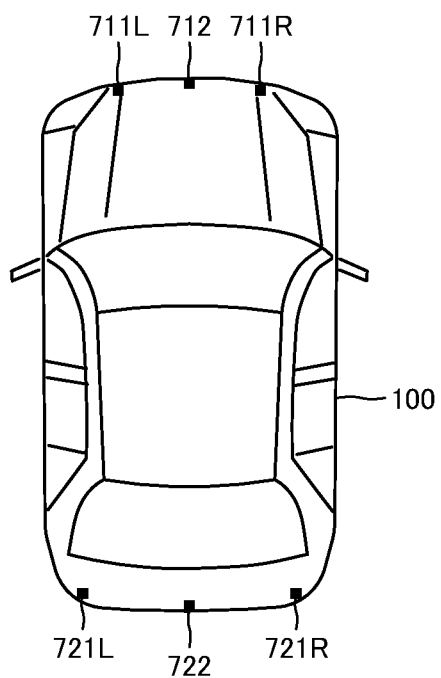
FIG. 2 is a view which shows radio wave sensors and image sensors provided on the own vehicle.

In particular, in this embodiment, the forward information detection apparatus 71 includes two forward radio wave sensors 711, i.e., a left forward radio wave sensor 711L and a right forward radio wave sensor 711R. As shown in FIG. 2, the left forward radio wave sensor 711L is provided on a left-side portion of a front edge of the own vehicle 100 so as to transmit the radio waves forward from the own vehicle 100. The right forward radio wave sensor 711R is provided on a right-side portion of the front edge of the own vehicle 100 so as to transmit the radio waves forward from the own vehicle 100. The left forward radio wave sensor 711L and the right forward radio wave sensor 711R detect objects ahead of the own vehicle 100 and send information on the detected objects to the ECU 90. The ECU 90 can acquire forward detection information IF on the objects ahead of the own vehicle 100 as the surrounding detection information IS, based on the radio wave information, i.e., the information sent from the left forward radio wave sensor 711L and the right forward radio wave sensor 711R.

Similarly, the rearward information detection apparatus 72 includes two rearward radio wave sensors 721, i.e., a left rearward radio wave sensor 721L and a right rearward radio wave sensor 721R. As shown in FIG. 2, the left rearward radio wave sensor 721L is provided on a left-side portion of a rear edge of the own vehicle 100 so as to transmit the radio waves rearward from the own vehicle 100. The right rearward radio wave sensor 721R is provided on a right-side portion of the rear edge of the own vehicle 100 so as to transmit the radio waves forward from the own vehicle 100. The left rearward radio wave sensor 721L and the right rearward radio wave sensor 721R detect objects behind the own vehicle 100 and send information on the detected objects to the ECU 90. The ECU 90 can acquire rearward detection information IR on the objects behind the own vehicle 100 as the surrounding detection information IS, based on the radio wave information, i.e., the information sent from the left rearward radio wave sensor 721L and the right rearward radio wave sensor 721R.

Image Sensors

The forward image sensor 712 and the rearward image sensor 722 are electrically connected to the ECU 90. The forward image sensor 712 and the rearward image sensor 722 take images views around the own vehicle 100 and send information on the taken images to the ECU 90. The ECU 90 can acquire information on situations around the own vehicle 100 as the surrounding detection information IS, based on image information, i.e., the information sent from the forward image sensor 712 and the rearward image sensor 722.

In particular, in this embodiment, the forward information detection apparatus 71 includes one forward image sensor 712. As shown in FIG. 2, the forward image sensor 712 is provided on a center portion of the front edge of the own vehicle 100 so as to take images of a view ahead of the own vehicle 100. The forward image sensor 712 sends information on the taken images to the ECU 90. The ECU 90 can acquire the forward detection information IF on the situation ahead of the own vehicle 100 as the surrounding detection information IS, based on forward image information, i.e., the information sent from the forward image sensor 712.

Similarly, the rearward information detection apparatus 72 includes one rearward image sensor 722. As shown in FIG. 2, the rearward image sensor 722 is provided on a center portion of the rear edge of the own vehicle 100 so as to take images of views behind the own vehicle 100. The rearward image sensor 722 sends information on the taken images to the ECU 90. The ECU 90 can acquire the rearward detection information IR on the situation behind the own vehicle 100 as the surrounding detection information IS, based on rearward image information, i.e., the information sent from the rearward image sensor 722.

Figure 3:
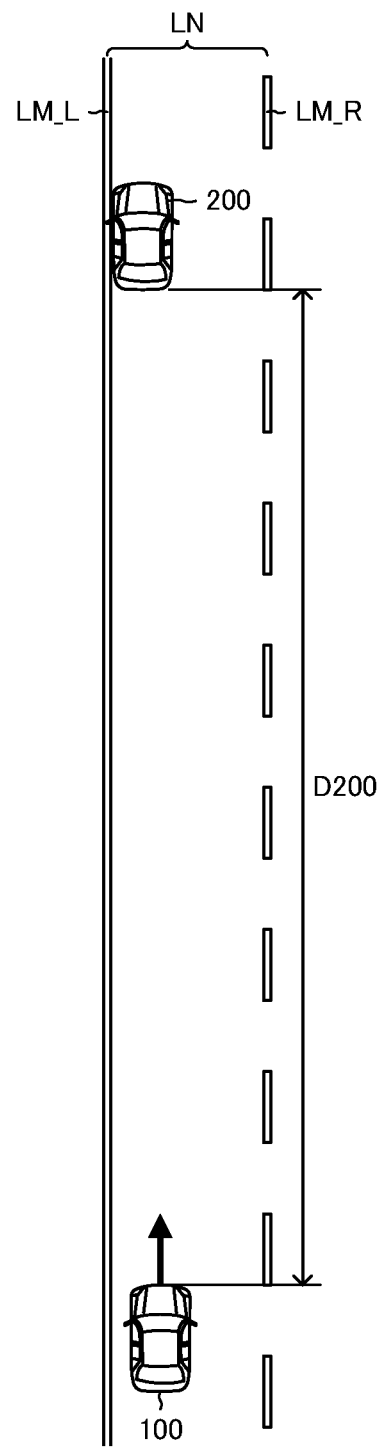
FIG. 3 is a view which shows a distance between the own vehicle and an object or another vehicle ahead of the own vehicle.

When there is a forward object 200, i.e., an object ahead of the own vehicle 100 as shown in FIG. 3, the ECU 90 detects the forward object 200, based on the surrounding detection information IS, in particular, the forward detection information IF. It should be noted that the forward object 200 is a vehicle, a motor bike, a bicycle, or a person. In an example shown in FIG. 3, the forward object 200 is a vehicle.

When the ECU 90 detects the forward object 200, the ECU 90 acquires a forward object distance D200 and a relative speed dV200, based on the surrounding detection information IS, in particular, the forward detection information IF. The forward object distance D200 is a distance between the forward object 200 and the own vehicle 100. The relative speed dV200 is a speed of the own vehicle 100 with respect to the forward object 200.

Further, the ECU 90 recognizes a left lane marking LM_L and a right lane marking LM_R, based on the surrounding detection information IS, in particular, the forward detection information IF. The left lane marking LM_L and the right lane marking LM_R define an own vehicle lane LN, i.e., a traffic lane in which the own vehicle 100 moves. The ECU 90 specifies an area of the own vehicle lane LN, based on recognized left-and-right lane markings LM, i.e., the left lane marking LM_L and the right lane marking LM_R.

Summary of Operations of Vehicle Driving Assistance Apparatus

Next, a summary of operations of the vehicle driving assistance apparatus 10 will be described.

The vehicle driving assistance apparatus 10 executes a process to detect objects such as vehicles ahead of the own vehicle 100 in a moving direction of the own vehicle 100, based on the surrounding detection information IS, in particular, the forward detection information IF while the own vehicle 100 moves. While the vehicle driving assistance apparatus 10 does not detect any objects ahead of the own vehicle 100 in the moving direction of the own vehicle 100, the vehicle driving assistance apparatus 10 executes an ordinary moving control.

The ordinary moving control is a control to (i) control the operations of the driving apparatus 21 so as to output the driving force corresponding to the requested driving force when the requested driving force is greater than zero, (ii) control the operations of the braking apparatus 22 so as to output the braking force corresponding to the requested braking force when the requested braking force is greater than zero, and (iii) control the operations of the steering apparatus 23 so as to output the steering force corresponding to the requested steering force when the requested steering force is greater than zero.

Figure 4A:
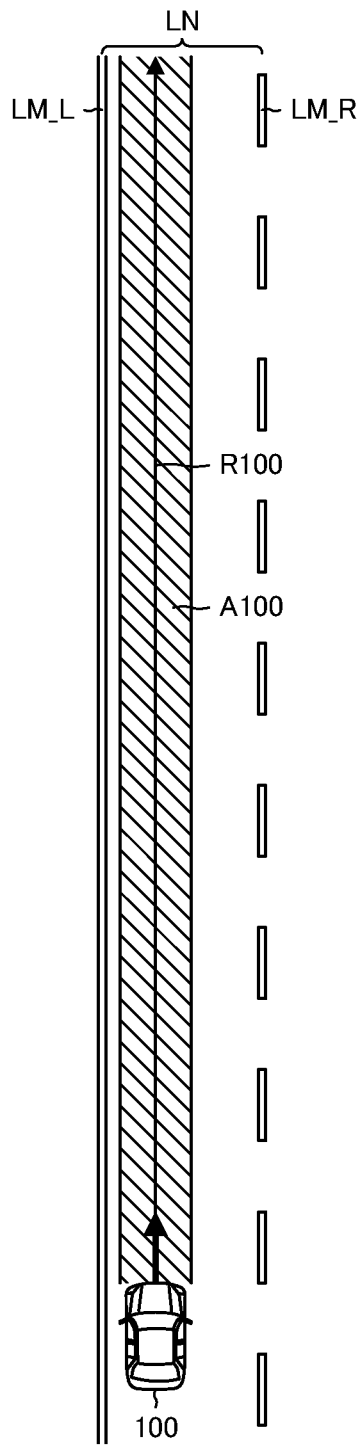
FIG. 4A is a view which shows a predicted moving area of the own vehicle.

When the vehicle driving assistance apparatus 10 detects an object as the forward object 200 ahead of the own vehicle 100 in the moving direction of the own vehicle 100, the vehicle driving assistance apparatus 10 determines whether the detected object is in a predicted moving area A100, based on the surrounding detection information IS, in particular, the forward detection information IF. As shown in FIG. 4A, the predicted moving area A100 is an area which has a center line corresponding to a predicted moving route R100 of the own vehicle 100 and a width equal to a width of the own vehicle 100. The predicted moving route R100 is a moving route along which the own vehicle 100 predictively moves from now, keeping the current steering angle θst. The predicted moving route R100 shown in FIG. 4A is straight. In this regard, the predicted moving route R100 may be curved, depending on the situation.

When the detected forward object 200 is not in the predicted moving area A100, the vehicle driving assistance apparatus 10 continues executing the ordinary moving control.

Figure 4B:
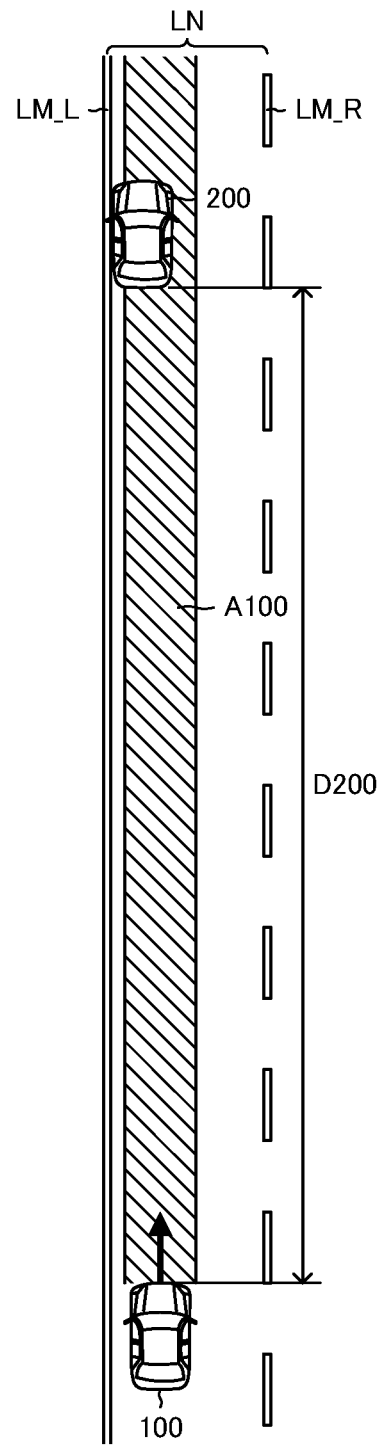
FIG. 4B is a view which shows a scene that there is an object or another vehicle in the predicted moving area of the own vehicle.

On the other hand, when the forward object 200 is in the predicted moving area A100 as shown in FIG. 4B, the vehicle driving assistance apparatus 10 detects the forward object 200, based on the surrounding detection information IS, in particular, the forward detection information IF. Then, the vehicle driving assistance apparatus 10 determines whether an alert condition is satisfied. When a collision index value IC decreases to a predetermined value or a first index value IC1, the vehicle driving assistance apparatus 10 determines that the alert condition becomes satisfied. The collision index value IC represents a probability that the own vehicle 100 collides with the forward object 200. The collision index value IC decreases as the possibility that the own vehicle 100 collides with the forward object 200, increases. In this embodiment, the vehicle driving assistance apparatus 10 acquires a predicted reaching time TTC as the collision index value IC. When the predicted reaching time TTC decreases to a predetermined time or a first determination time TTC1, the vehicle driving assistance apparatus 10 determines that the alert condition becomes satisfied.

The predicted reaching time TTC is a time predictively taken for the own vehicle 100 to reach the forward object 200. The vehicle driving assistance apparatus 10 acquires the predicted reaching time TTC by dividing the forward object distance D200 by the relative speed dV200 (TTC=D200/dV200). Thus, the predicted reaching time TTC decreases as the own vehicle 100 approaches the forward object 200 when the relative speed dV200 is constant.

While the vehicle driving assistance apparatus 10 determines that the forward object 200 is in the predicted moving area A100, the vehicle driving assistance apparatus 10 performs acquiring (i) the forward object distance D200, i.e., the distance between the forward object 200 and the own vehicle 100, (ii) the relative speed dV200, and (iii) the predicted reaching time TTC with a predetermined calculation cycle. In addition, the vehicle driving assistance apparatus 10 performs determining whether the predicted reaching time TTC decreases to the first determination time TTC1 each time the vehicle driving assistance apparatus 10 acquires the predicted reaching time TTC. The vehicle driving assistance apparatus 10 acquires the forward object distance D200 and the relative speed dV200, based on the surrounding detection information IS, in particular, the forward detection information IF.

When the predicted reaching time TTC is greater than the first determination time TTC1, the vehicle driving assistance apparatus 10 continues executing the ordinary moving control. Further, the vehicle driving assistance apparatus 10 continues executing the ordinary moving control until the vehicle driving assistance apparatus 10 starts executing a deceleration control described later in detail.

Figure 5A:
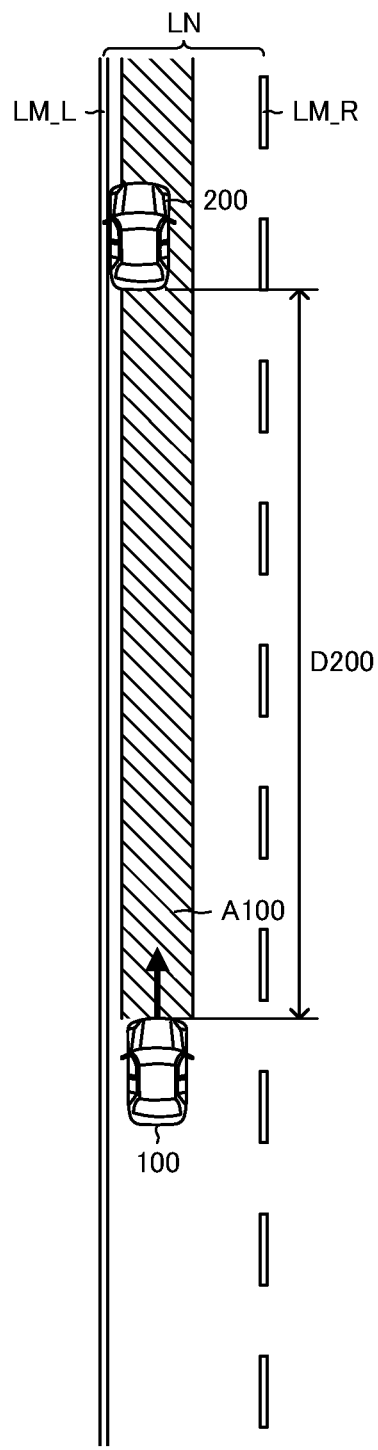
FIG. 5A is a view which shows a scene that the own vehicle has approached the object or the other vehicle in the predicted moving area of the own vehicle, and an alert condition becomes satisfied.

When (i) the own vehicle 100 approaches the forward object 200 as shown in FIG. 5A, and (ii) the predicted reaching time TTC decreases to the first determination time TTC1, the vehicle driving assistance apparatus 10 determines that the alert condition becomes satisfied.

Alert Control

When the vehicle driving assistance apparatus 10 determines that the alert condition becomes satisfied, the vehicle driving assistance apparatus 10 starts executing an alert control. The alert control is a control to output the informing sound or the alert sound, or the informing announcement or the alert announcement from the alert apparatus 40 and display the informing image or the alert image by the alert apparatus 40.

The informing sound or the alert sound output from the alert apparatus 40 by the alert control, is a sound which informs the driver that (i) there is an object ahead of the own vehicle 100, i.e., the forward object 200, or (ii) the own vehicle 100 has the probability of colliding with the object ahead of the own vehicle 100, i.e., the forward object 200. The informing announcement or the alert announcement output from the alert apparatus 40 by the alert control, is a sound which announces that (i) there is an object ahead of the own vehicle 100, i.e., the forward object 200, or (ii) the own vehicle 100 has the probability of colliding with the object ahead of the own vehicle 100, i.e., the forward object 200, or (iii) a driving maneuvering to avoid the collision of the own vehicle 100 with the object ahead of the own vehicle 100, i.e., the forward object 200.

The informing image or the alert image displayed by the alert apparatus 40 by the alert control, is an image which displays that (i) there is an object ahead of the own vehicle 100, i.e., the forward object 200 with characters or graphic, or (ii) the own vehicle 100 has the probability of colliding with the object ahead of the own vehicle 100, i.e., the forward object 200 with characters or graphic, or (iii) a driving maneuvering to avoid the collision of the own vehicle 100 with the object ahead of the own vehicle 100, i.e., the forward object 200 with characters or graphic.

Collision Avoidance Control

After the alert condition becomes satisfied, the vehicle driving assistance apparatus 10 determines whether a collision condition is satisfied.

Collision Condition

The collision condition becomes satisfied when the collision index value IC decreases to a predetermined value or a second index value IC2 smaller than the first index value IC1. In this embodiment, the collision condition becomes satisfied when the predicted reaching time TTC decreases to a predetermined time or a second determination time TTC2 smaller than the first determination time TTC1.

Figure 5B:
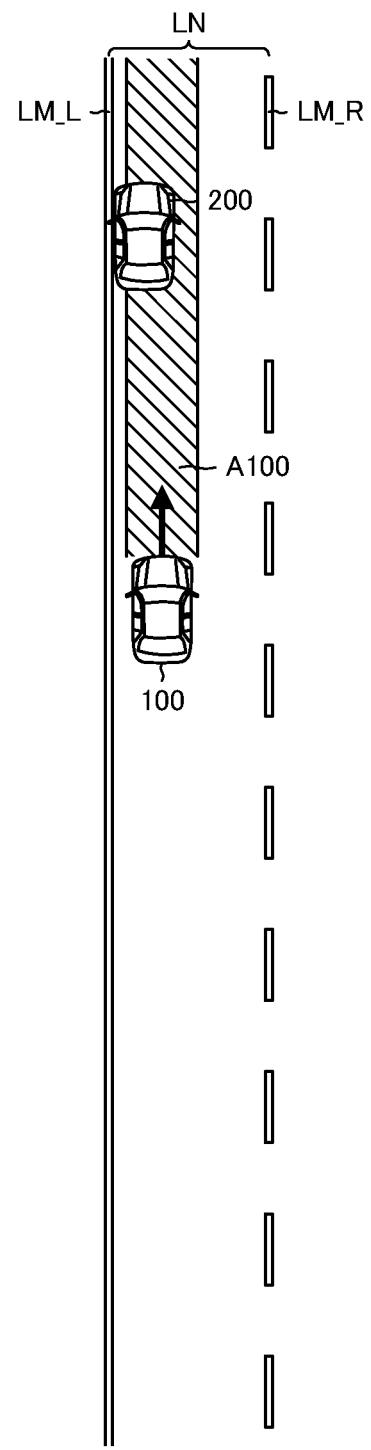
FIG. 5B is a view which shows a scene that the own vehicle has come close to the object or the other vehicle in the predicted moving area of the own vehicle, and a collision condition becomes satisfied.

Thus, when the own vehicle 100 approaches the forward object 200, and the predicted reaching time TTC decreases to the second determination time TTC2 without the driver carrying out a collision avoidance driving maneuvering as shown in FIG. 5B, the vehicle driving assistance apparatus 10 determines that the collision condition becomes satisfied. The collision avoidance driving maneuvering is a driving maneuvering to avoid the collision of the own vehicle 100 with the forward object 200.

When the collision condition becomes satisfied, and a forbiddance condition described later in detail is not satisfied, the vehicle driving assistance apparatus 10 starts to execute the collision avoidance control as an automatic driving control or an autonomous driving control.

The collision avoidance control is a control to control the driving force applied to the own vehicle 100 to zero and forcibly apply the braking force to the own vehicle 100 to stop the same before the forward object 200, independently of an operation on the accelerator pedal or the brake pedal carried out by the driver.

While the vehicle driving assistance apparatus 10 executes the collision avoidance control, the vehicle driving assistance apparatus 10 sets a target deceleration and controls the braking force applied to the own vehicle 100 so as to decelerate the own vehicle 100 at the target deceleration. The target deceleration is a deceleration of the own vehicle 100 necessary to stop the own vehicle 100 before the forward object 200.

Figures 6A, 6B:
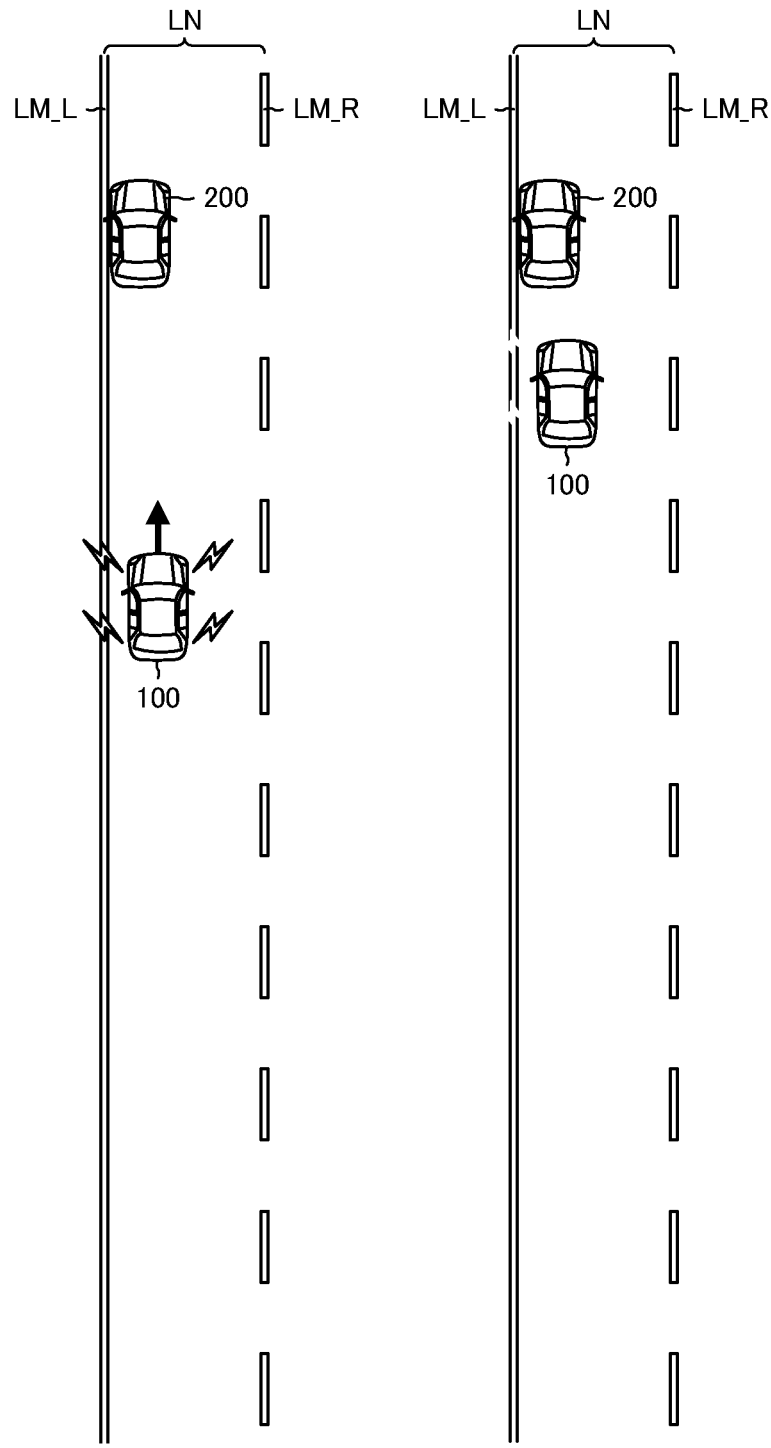
FIG. 6A is a view which shows a scene that the collision avoidance control starts being executed.
FIG. 6B is a view which shows a scene that the own vehicle is stopped by the collision avoidance control.

Thereby, the driving force applied to the own vehicle 100 is controlled to zero, and the braking force starts being applied to the own vehicle 100 as shown in FIG. 6A. Thereafter, the own vehicle 100 stops before the forward object 200 as shown in FIG. 6B. Thereby, the collision of the own vehicle 100 with the forward object 200 is avoided.

It should be noted that the vehicle driving assistance apparatus 10 continues executing the alert control while the vehicle driving assistance apparatus 10 executes the collision avoidance control, however the vehicle driving assistance apparatus 10 may be configured to stop executing the alert control when the vehicle driving assistance apparatus 10 starts to execute the collision avoidance control.

Further, the vehicle driving assistance apparatus 10 may be configured to execute the collision avoidance control to forcibly brake and steer the own vehicle 100 so as to avoid the collision of the own vehicle 100 with the forward object 200 when (i) the collision condition becomes satisfied, and (ii) the vehicle driving assistance apparatus 10 determines that the own vehicle 100 should be steered so as to avoid the forward object 200.

Figure 7:
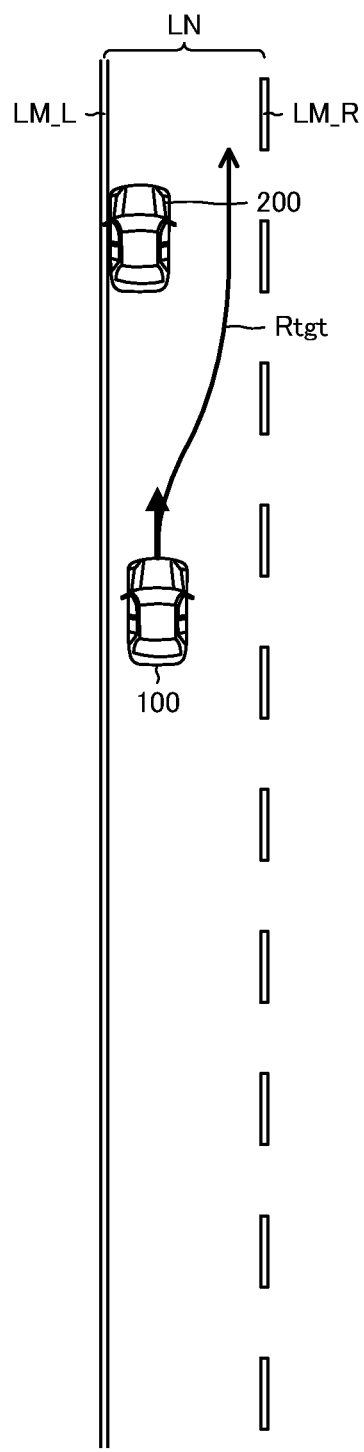
FIG. 7 is a view which shows a target avoidance route used by the collision avoidance control.

In this case, the vehicle driving assistance apparatus 10 sets a target avoidance route Rtgt, based on the surrounding detection information IS when the collision condition becomes satisfied. The target avoidance route Rtgt is a route along which the own vehicle 100 is moved within the own vehicle lane LN to pass by the forward object 200 to avoid the collision of the own vehicle 100 with the forward object 200 as shown in FIG. 7. It should be noted that in an example shown in FIG. 7, the target avoidance route Rtgt is a route passing through the right side of the own vehicle 100, however the target avoidance route Rtgt may be a route passing through the left side of the forward object 200 when there is a space at the left side of the forward object 200 where the own vehicle 100 can pass by the forward object 200 within the own vehicle lane LN.

When the vehicle driving assistance apparatus 10 acquires the target avoidance route Rtgt, the vehicle driving assistance apparatus 10 controls the steering force applied to the own vehicle 100 such that the own vehicle 100 moves along the target avoidance route Rtgt. Thus, the vehicle driving assistance apparatus 10 controls the steering force applied to the own vehicle 100 so as to move the own vehicle 100 along the target avoidance route Rtgt.

Figure 8A:
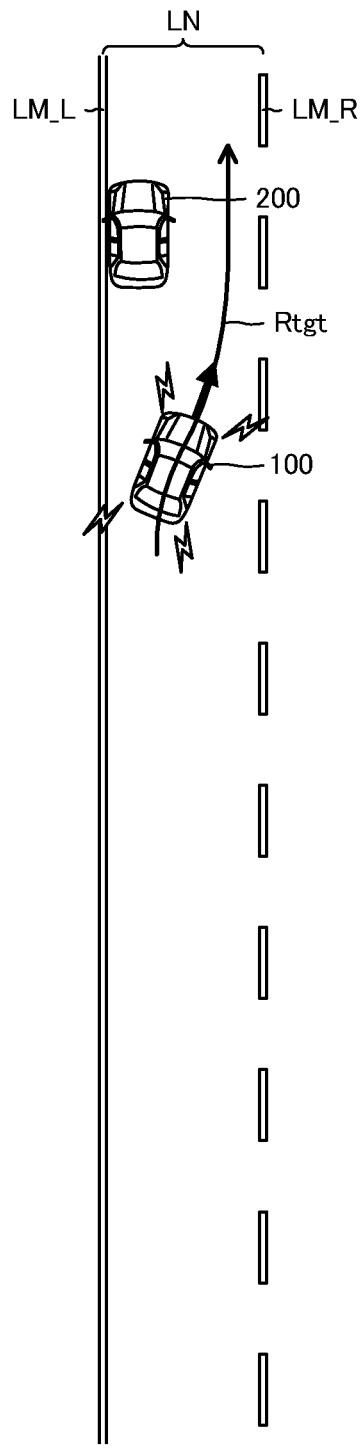
FIG. 8A is a view which shows a scene that the collision avoidance control starts being executed, and the own vehicle starts turning along the target avoidance route.
Figure 8B:
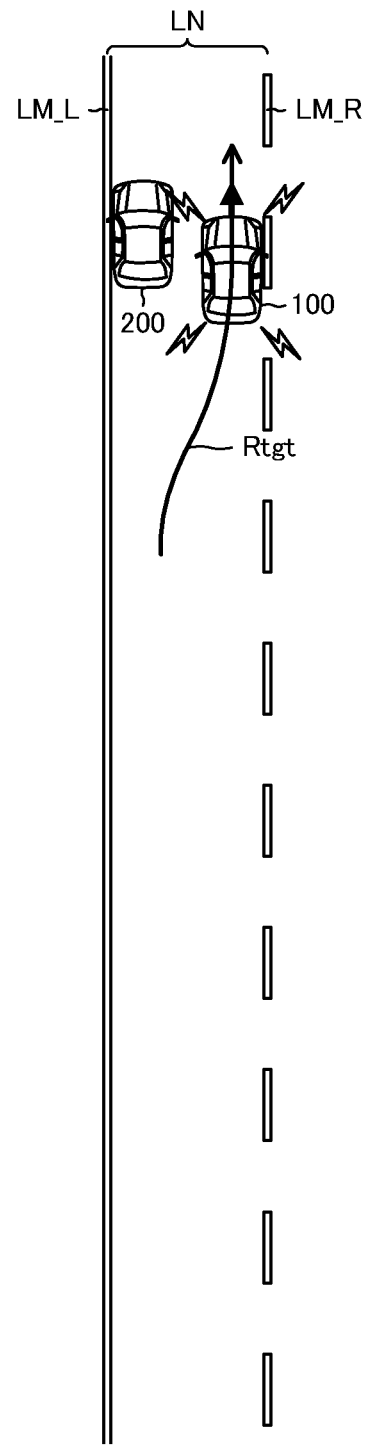
FIG. 8B is a view which shows a scene that the own vehicle is caused to pass by the object or the other vehicle ahead of the own vehicle by the collision avoidance control.
Figure 8C:
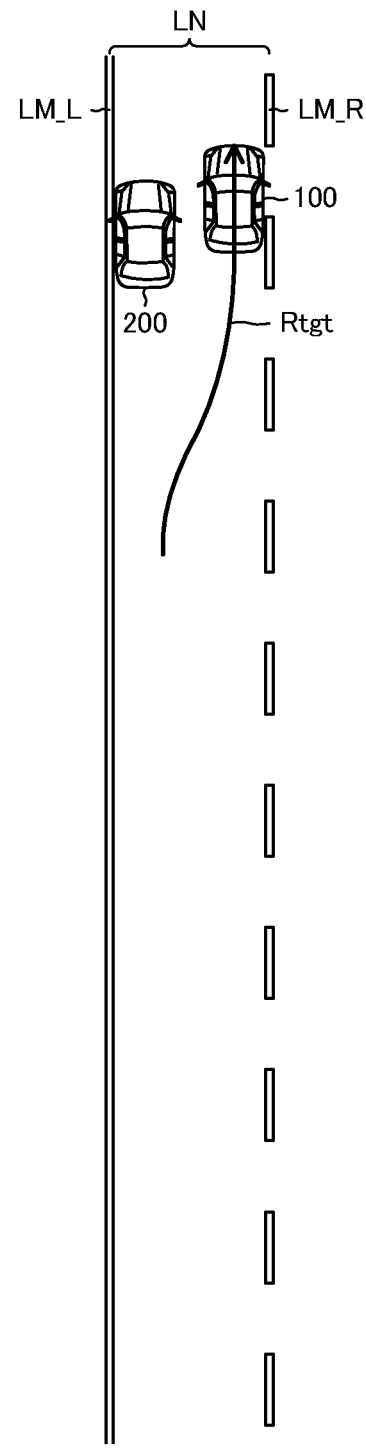
FIG. 8C is a view which shows a scene that the own vehicle is stopped at the side of the object or the other vehicle by the collision avoidance control.

Thereby, the own vehicle 100 starts turning as shown in FIG. 8A. Immediately thereafter, the own vehicle 100 turns in an opposite direction such that the moving direction of the own vehicle 100 becomes parallel to the own vehicle lane LN. Then, the own vehicle 100 passes by the forward object 200 as shown in FIG. 8B. Thereby, the collision of the own vehicle 100 with the forward object 200 is avoided. While the own vehicle 100 moves as described above, the own vehicle 100 is braked and decelerated and is stopped at the side of the forward object 200 as shown in FIG. 8C.

Stopped-State Holding Control

After the vehicle driving assistance apparatus 10 stops the own vehicle 100 by the collision avoidance control, the vehicle driving assistance apparatus 10 terminates executing the collision avoidance control and the alert control and starts to execute a stopped-state holding control. The stopped-state holding control is a control to hold the own vehicle 100 in a stopped state. In particular, the stopped-state holding control is a control to continue applying to the own vehicle 100, the braking force enough to hold the own vehicle 100 in the stopped state by an electric parking brake.

Forbiddance Condition

Figure 9:
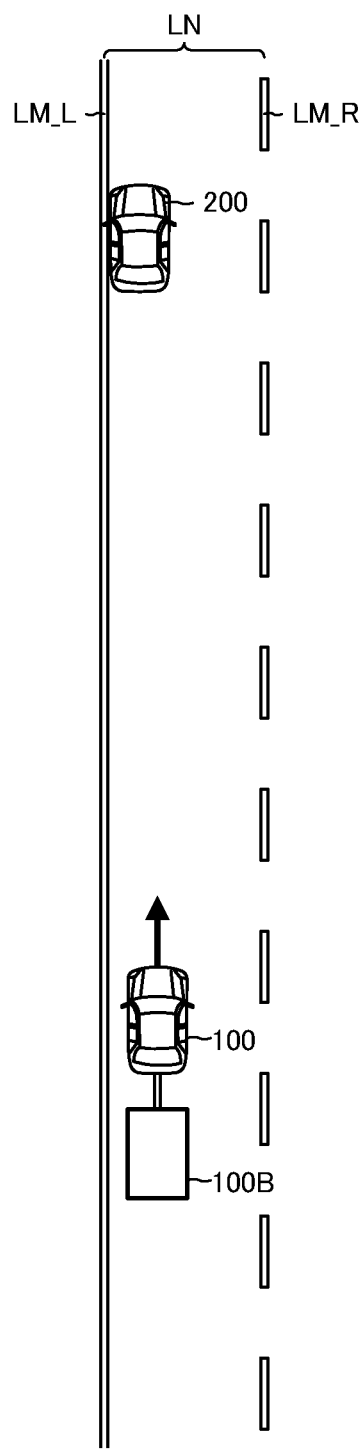
FIG. 9 is a view which shows the own vehicle which moves towing a vehicle or a trailer.
Figures 10A, 10B:
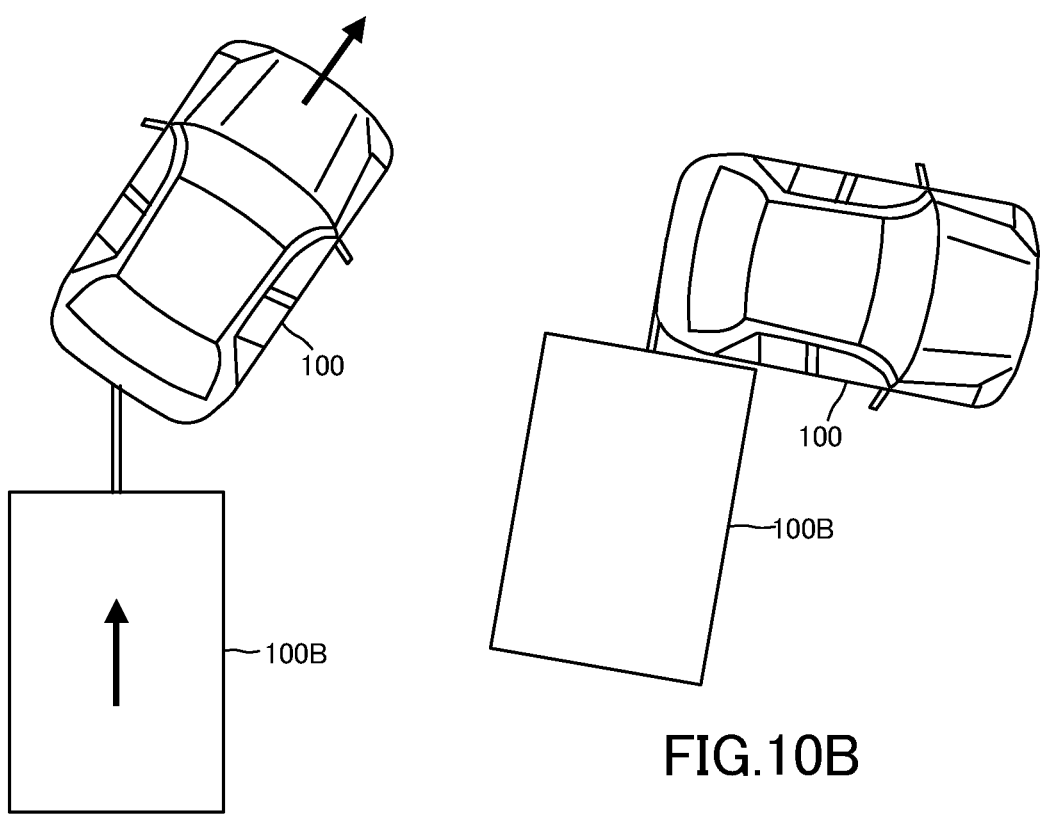
FIG. 10A is a view which shows a scene that the own vehicle turns towing the vehicle or the trailer.
FIG. 10B is a view which shows a scene that the Jackknifing of the own vehicle occurs.

As shown in FIG. 9, the own vehicle 100 may tow a trailer 100B, i.e., a vehicle such as a cargo vehicle. Also, in this case, in order to avoid the collision of the own vehicle 100 towing the trailer 100B, i.e., the collision of a towing vehicle with the forward object 200, i.e., an object ahead of the own vehicle 100, it is effective to execute the collision avoidance control to forcibly brake the own vehicle 100 to stop the same before the forward object 200 when the own vehicle 100 has the probability of colliding with the forward object 200. In this regard, if the collision avoidance control is executed, and the own vehicle 100 is forcibly braked when the own vehicle 100 turns as shown in FIG. 10A, the own vehicle 100 is pushed by the trailer 100B, and a so-called Jackknifing of the own vehicle 100 may occur as shown in FIG. 10B since the moving direction of the own vehicle 100 does not correspond to a moving direction of the trailer 100B, and the own vehicle 100 and the trailer 100B orient in different directions.

Thus, the collision avoidance control should not be executed when the Jackknifing of the own vehicle 100 occurs if the collision avoidance control is executed. On the other hand, when the Jackknifing of the own vehicle 100 does not occur even if the collision avoidance control is executed, the collision avoidance control should be executed. In order to execute the collision avoidance control when the Jackknifing of the own vehicle 100 occurs if the collision avoidance control is executed, and keep the collision avoidance control unexecuted when the Jackknifing of the own vehicle 100 does not occur even if the collision avoidance control is executed, it is necessary to accurately determine whether the Jackknifing of the own vehicle 100 occurs if the collision avoidance control is executed.

Accordingly, the vehicle driving assistance apparatus 10 is configured to determine whether the Jackknifing of the own vehicle 100 occurs if the collision avoidance control is executed. That is, the vehicle driving assistance apparatus 10 is configured to determine whether a forbiddance condition is satisfied as described below.

Figure 11:
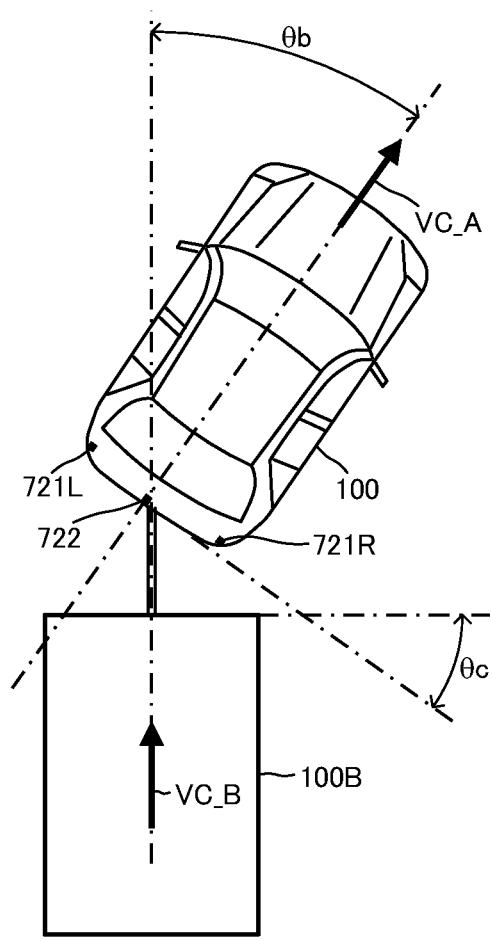
FIG. 11 is a view which shows a towing angle.

When the collision condition becomes satisfied, and the own vehicle 100 tows a vehicle, i.e., the trailer 100B, the vehicle driving assistance apparatus 10 acquires a towing angle θb shown in FIG. 11, based on the rearward detection information IR. The towing angle θb is an angle defined by a moving vector VC_A of the own vehicle 100 and a moving vector VC_B of the trailer 100B.

In particular, the own vehicle 100 determines whether the own vehicle 100 tows a vehicle, i.e., the trailer 100B, based on the radio wave information or rearward radio wave information provided from the left rearward radio wave sensor 721L and the right rearward radio wave sensor 721R. For example, when (i) the vehicle driving assistance apparatus 10 determines that there is an object behind the own vehicle 100, based on the rearward radio wave information, (ii) a rearward object distance Db is equal to or smaller than a predetermined distance Db_th, and (iii) the rearward object distance Db has no variation or almost no variation, the vehicle driving assistance apparatus 10 determines that the own vehicle 100 tows a vehicle or the trailer 100B. The predetermined distance Db_th is set to a very small distance.

When the vehicle driving assistance apparatus 10 determines that the own vehicle 100 tows the trailer 100B, the vehicle driving assistance apparatus 10 acquires a relationship in position between reflected points of the trailer 100B and a relationship in position between (i) the reflected points, (ii) the left rearward radio wave sensor 721L, and (iii) the right rearward radio wave sensor 721R, based on the rearward radio wave information. The towing angle θb can be acquired from the acquired relationships in position. Thus, the vehicle driving assistance apparatus 10 acquires the towing angle θb, based on the acquired relationships in position.

It should be noted that the reflected points of the trailer 100B are points on the trailer 100B which reflects the radio waves transmitted from the left rearward radio wave sensor 721L and the right rearward radio wave sensor 721R.

Further, the towing angle θb is the angle defined by the moving vector VC_A of the own vehicle 100 and the moving vector VC_B of the trailer 100B and is equal to an angle θc defined by a rear edge of the own vehicle 100 and a front edge of the trailer 100B as shown in FIG. 11. Accordingly, the vehicle driving assistance apparatus 10 may be configured to acquire the angle θc as the towing angle θb, based on the rearward detection information IR.

When the acquired towing angle θb is equal to or greater than a predetermined angle or a predetermined towing angle θb_th, the vehicle driving assistance apparatus 10 determines that the forbiddance condition is satisfied. While the vehicle driving assistance apparatus 10 has determined that the forbiddance condition is satisfied, the vehicle driving assistance apparatus 10 keeps the collision avoidance control unexecuted even when the collision condition becomes satisfied.

It should be noted that the vehicle driving assistance apparatus 10 may be configured to determine whether the own vehicle 100 tows a vehicle or the trailer 100B, based on the image information or the rearward image information provided from the rearward image sensor 722. Further, the vehicle driving assistance apparatus 10 may be configured to acquire the towing angle θb, based on the rearward image information.

Advantages

With the vehicle driving assistance apparatus 10, the towing angle θb is acquired, based on the information on the situation behind the own vehicle 100, i.e., the rearward detection information IR. Thus, the accurate towing angle θb is acquired, and whether the forbiddance condition is satisfied, is determined, based on the accurate towing angle θb. That is, whether the collision avoidance control should be executed, is determined, based on the accurate towing angle θb. Thus, whether the Jackknifing of the own vehicle 100 occurs if the collision avoidance control is executed, is accurately determined.

Specific Operations of Vehicle Driving Assistance Apparatus

Next, specific operations of the vehicle driving assistance apparatus 10 will be described. The CPU of the ECU 90 of the vehicle driving assistance apparatus 10 according to the embodiment of the invention is configured or programmed to execute a routine shown in FIG. 12 with a predetermined calculation cycle. Thus, at a predetermined timing, the CPU starts to execute a process from a step 1200 of the routine shown in FIG. 12 and proceeds with the process to a step 1205 to determine whether the alert condition is satisfied.

When the CPU determines "Yes" at the step 1205, the CPU proceeds with the process to a step 1210 to execute the alert control. Then, the CPU proceeds with the process to a step 1215 to determine whether the collision condition is satisfied. When the CPU determines "Yes" at the step 1215, the CPU proceeds with the process to a step 1220 to execute a routine shown in FIG. 13.

Figure 13:
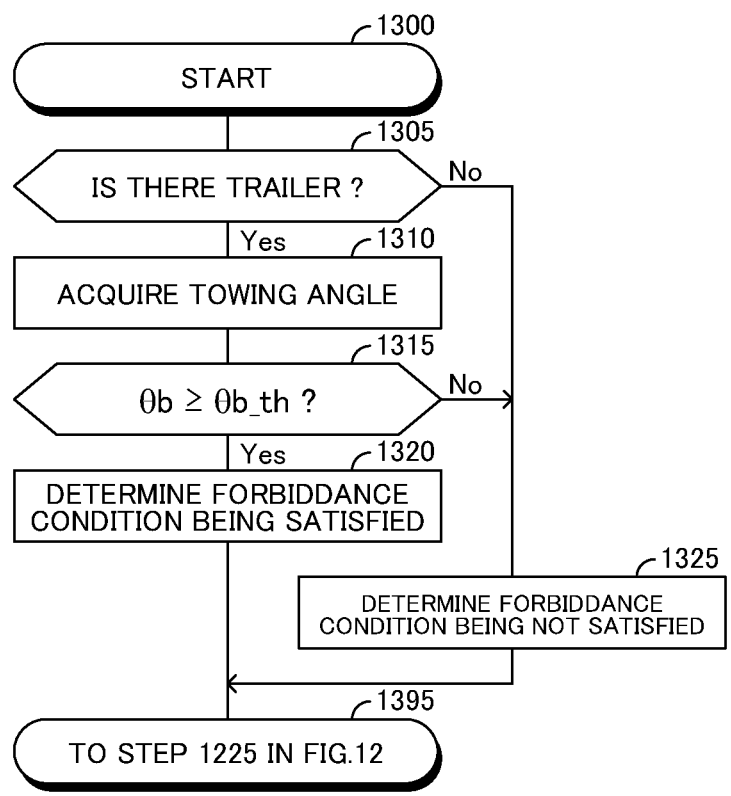
FIG. 13 is a view which shows a flowchart of a routine executed by the vehicle driving assistance apparatus according to the embodiment of the invention.

Thus, when the CPU proceeds with the process to the step 1220, the CPU starts to execute a process from a step 1300 of the routine shown in FIG. 13 and proceeds with the process to a step 1305 to determine whether there is the trailer 100B. When the CPU determines "Yes" at the step 1305, the CPU proceeds with the process to a step 1310 to acquire the towing angle θb, based on the rearward detection information IR. Then, the CPU proceeds with the process to a step 1315 to determine whether the towing angle θb is equal to or greater than the predetermined towing angle θb_th.

Figure 12:
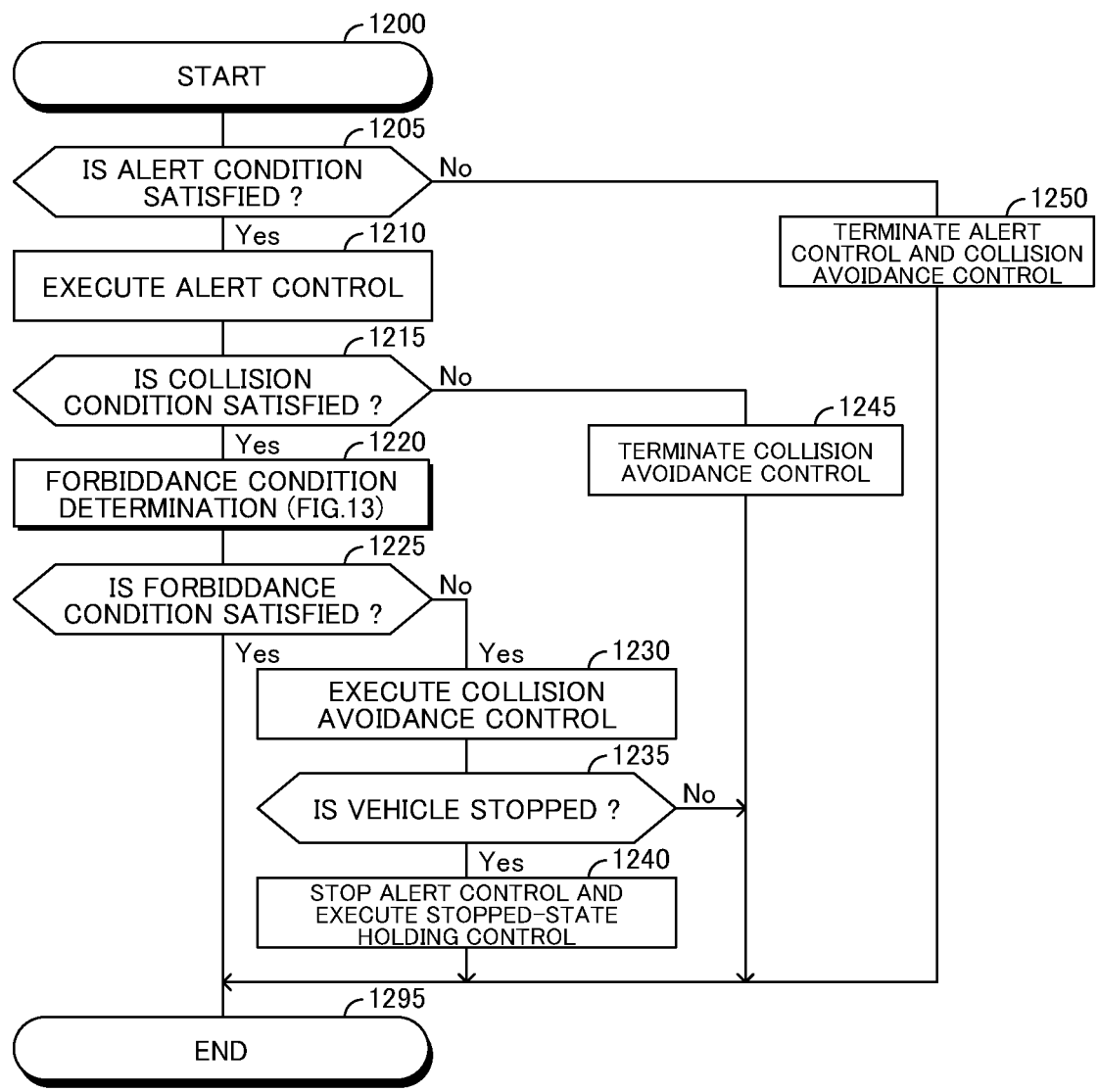
FIG. 12 is a view which shows a flowchart of a routine executed by the vehicle driving assistance apparatus according to the embodiment of the invention.

When the CPU determines "Yes" at the step 1315, the CPU proceeds with the process to a step 1320 to determine that the forbiddance condition is satisfied and proceeds with the process to a step 1225 of the routine shown in FIG. 12 via a step 1395.

On the other hand, when the CPU determines "No" at the step 1315, the CPU proceeds with the process to a step 1325 to determine that the forbiddance condition is not satisfied and proceeds with the process to the step 1225 of the routine shown in FIG. 12 via the step 1395.

Also, when the CPU determines "No" at the step 1305, the CPU proceeds with the process to the step 1325 to determine that the forbiddance condition is not satisfied and proceeds with the process to the step 1225 of the routine shown in FIG. 12 via the step 1395.

When the CPU proceeds with the process to the step 1225 of the routine shown in FIG. 12, the CPU determines whether to determine that the forbiddance condition is satisfied as a result of executing the routine shown in FIG. 13 at the step 1220. When the CPU determines "Yes" at the step 1225, the CPU proceeds with the process directly to a step 1295 to terminate executing the process of this routine once. In this case, the collision avoidance control is not executed.

On the other hand, when the CPU determines "No" at the step 1225, the CPU proceeds with the process to a step 1230 to execute the collision avoidance control. Then, the CPU proceeds with the process to a step 1235 to determine whether the own vehicle 100 is stopped.

When the CPU determines "Yes" at the step 1235, the CPU proceeds with the process to a step 1240 to stop executing the alert control and the collision avoidance control and execute the stopped-state holding control. Then, the CPU proceeds with the process to the step 1295 to terminate executing the process of this routine once.

On the other hand, when the CPU determines "No" at the step 1235, the CPU proceeds with the process directly to the step 1295 to terminate executing the process of this routine once.

Further, when the CPU determines "No" at the step 1215, the CPU proceeds with the process to a step 1245 to terminate executing the collision avoidance control if the CPU executes the collision avoidance control. Then, the CPU proceeds with the process to the step 1295 to terminate executing the process of this routine once.

Further, when the CPU determines "No" at the step 1205, the CPU proceeds with the process to a step 1250 to terminate executing the alert control if the CPU executes the alert control and terminate executing the collision avoidance control if the CPU executes the collision avoidance control. Then, the CPU proceeds with the process to the step 1295 to terminate executing the process of this routine once.

The specific operations of the own vehicle 100 have been described.

It should be noted that the invention is not limited to the aforementioned embodiments, and various modifications can be employed within the scope of the invention.

For example, the vehicle driving assistance apparatus 10 may be configured to determine that the forbiddance condition is satisfied when (i) the towing angle θb is smaller than the predetermined towing angle θb_th, but the towing angle θb is equal to or greater than a predetermined angle or a predetermined upper limit towing angle θb_limit smaller than the predetermined towing angle θb_th, and (ii) an increasing rate of the towing angle θb or a towing angle increasing rate dθb is equal to or greater than a predetermined increasing rate dθb_th when the collision condition becomes satisfied. In other words, the vehicle driving assistance apparatus 10 may be configured to determine that the forbiddance condition is satisfied when the towing angle θb is smaller than the predetermined towing angle θb_th, but the towing angle θb will become equal to or greater than the predetermined towing angle θb_th in predetermined time when the collision condition becomes satisfied. It should be noted that the predetermine time in question is set to a time equal to or smaller than a time until an execution of the collision avoidance control is terminated from a point of time when the collision condition becomes satisfied, assuming that the collision avoidance control starts to be executed at a point of time when the collision condition becomes satisfied.

In this case, the vehicle driving assistance apparatus 10 is configured to (i) pick up an optional reflected point as a representative point from among the reflected points of the trailer 100B detected, based on the rearward detection information IR, (ii) acquire a relative speed dV_B of the trailer 100B or the representative point with respect to the own vehicle 100, a relative moving amount D_B or a moving amount per unit time of the trailer 100B or the representative point with respect to the own vehicle 100, and a relative acceleration G_B or an acceleration of the trailer 100B or the representative point with respect to the own vehicle 100, and (iii) acquire the towing angle increasing rate dθb, based on the relative speed dV_B, the relative moving amount D_B, and the relative acceleration G_B.

Figure 14:
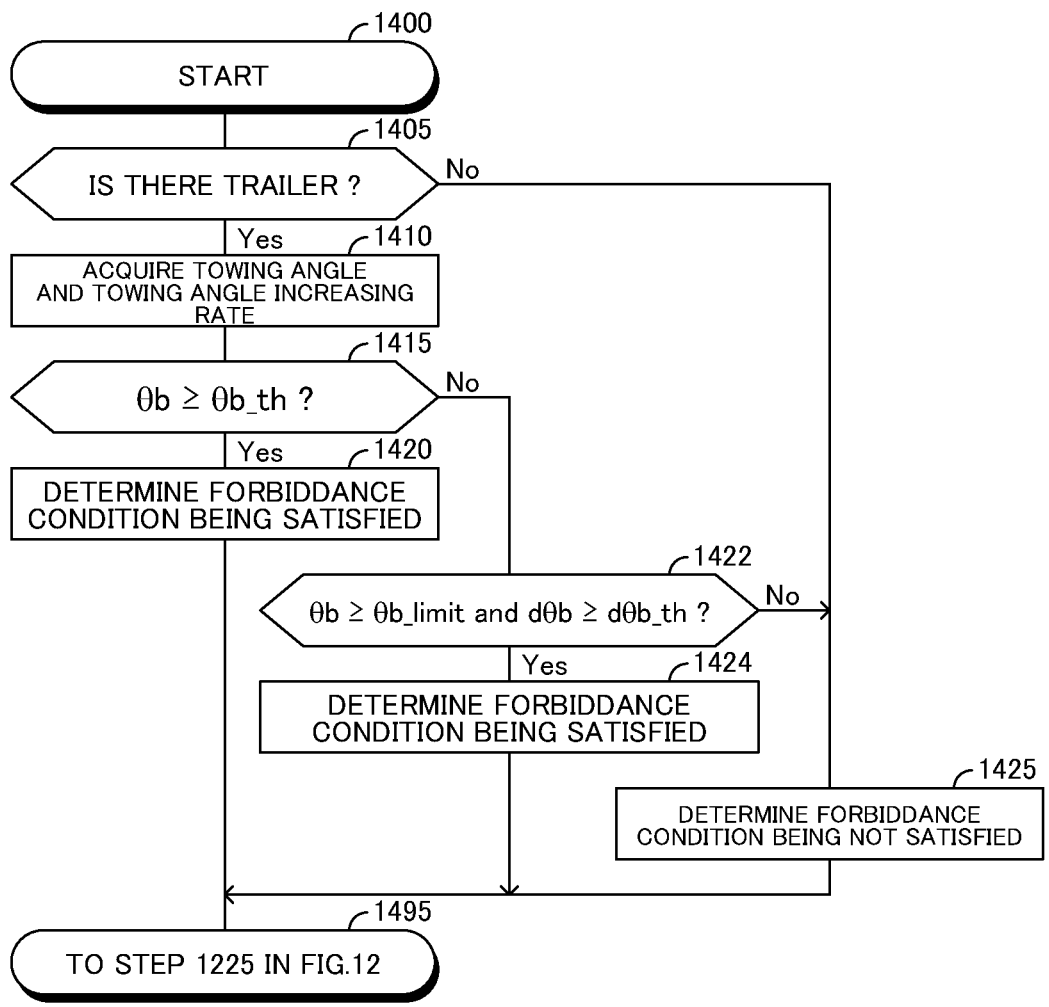
FIG. 14 is a view which shows a flowchart of a routine executed by the vehicle driving assistance apparatus according to the embodiment of the invention.

In this case, the CPU of the ECU 90 of the own vehicle 100 is configured or programmed to execute a routine shown in FIG. 14 in place of the routine shown in FIG. 13 when the CPU proceeds with the process to the step 1220 of the routine shown in FIG. 12.

Thus, in this case, when the CPU proceeds with the process to the step 1220 of the routine shown in FIG. 12, the CPU starts to execute a process from a step 1400 of the routine shown in FIG. 14 and proceeds with the process to a step 1405 to determine whether there is the trailer 100B. When the CPU determines "Yes" at the step 1405, the CPU proceeds with the process to a step 1410 to acquire the towing angle θb and the towing angle increasing rate dθb, based on the rearward detection information IR. Then, the CPU proceeds with the process to a step 1415 to determine whether the towing angle θb is equal to or greater than the predetermined towing angle θb_th.

When the CPU determines "Yes" at the step 1415, the CPU proceeds with the process to a step 1420 to determine that the forbiddance condition is satisfied and proceeds with the process to the step 1225 of the routine shown in FIG. 12 via a step 1495.

On the other hand, when the CPU determines "No" at the step 1415, the CPU proceeds with the process to a step 1422 to determine whether the towing angle θb is equal to or greater than the predetermined upper limit towing angle θb_limit, and the towing angle increasing dθb is equal to or greater than the predetermined increasing rate dθb_th. When the CPU determines "Yes" at the step 1422, the CPU proceeds with the process to a step 1425 to determine that the forbiddance condition is satisfied and proceeds with the process to the step 1225 of the routine shown in FIG. 12 via the step 1495.

On the other hand, when the CPU determines "No" at the step 1422, the CPU proceeds with the process to a step 1425 to determine that the forbiddance condition is not satisfied and proceeds with the process to the step 1225 of the routine shown in FIG. 12 via the step 1495.

Also, when the CPU determines "No" at the step 1405, the CPU proceeds with the process to the step 1425 to determine that the forbiddance condition is not satisfied and proceeds with the process to the step 1225 of the routine shown in FIG. 12 via the step 1495.

What is claimed is:

1. A vehicle driving assistance apparatus, comprising an electronic control unit which executes a collision avoidance control to avoid a collision of an own vehicle with an object ahead of the own vehicle by forcibly braking and stopping the own vehicle before the object when a collision condition that the own vehicle collides with the object, becomes satisfied, wherein the electronic control unit is configured to:
acquire information on a situation behind the own vehicle as rearward detection information when the own vehicle tows a trailer;
acquire an angle between a moving vector of the own vehicle and a moving vector of the trailer as a towing angle; and
keep the collision avoidance control unexecuted even when the collision condition becomes satisfied when a forbiddance condition that the towing angle is equal to or greater than a predetermined towing angle, is satisfied, wherein the electronic control unit is configured to determine that the forbiddance condition is satisfied and keep the collision avoidance control unexecuted when the towing angle is predicted to become equal to or greater than the predetermined towing angle even when (i) the collision condition becomes satisfied, and (ii) the towing angle is smaller than the predetermined towing angle, and wherein the electronic control unit is configured to determine that the towing angle is predicted to become equal to or greater than the predetermined towing angle when an increasing rate of the towing angle is equal to or greater than a predetermined increasing rate.

2. The vehicle driving assistance apparatus as set forth in claim 1, wherein the vehicle driving assistance apparatus includes a rearward information detection apparatus which detects information on the trailer behind the own vehicle as the rearward detection information.

3. The vehicle driving assistance apparatus as set forth in claim 2, wherein the rearward information detection apparatus includes at least one radio wave sensor provided on the own vehicle so as to transmit radio waves rearward from the own vehicle.

4. The vehicle driving assistance apparatus as set forth in claim 1, wherein the electronic control unit is configured to determine that the forbiddance condition is satisfied when the towing angle is smaller than the predetermined towing angle and the towing angle will become equal to or greater than the predetermined towing angle in a predetermined time when the collision condition becomes satisfied.

5. The vehicle driving assistance apparatus as set forth in claim 4, wherein the predetermined time is a time equal to or smaller than a time until an execution of the collision avoidance control is terminated from a point of time when the collision condition becomes satisfied.

* * * * *